US007453223B2

(12) United States Patent
Buck et al.

(10) Patent No.: US 7,453,223 B2
(45) Date of Patent: Nov. 18, 2008

(54) METHOD FOR ACTIVE COMPENSATION OF OSCILLATIONS IN A MACHINE WHICH PROCESSES PRINTING MATERIAL, AND A MACHINE WHICH PROCESSES PRINTING MATERIAL

(75) Inventors: Bernhard Buck, Heidelberg (DE); Eric Knopf, Heidelberg (DE); Matthias Nöll, Weiterstadt (DE); Malte Seidler, Heidelberg (DE); Detleff Strunk, Heidelberg (DE); Uwe Tessmann, Schwetzingen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 103 days.

(21) Appl. No.: 11/698,312

(22) Filed: Jan. 25, 2007

(65) Prior Publication Data

US 2007/0120514 A1 May 31, 2007

(30) Foreign Application Priority Data

Feb. 1, 2006 (DE) ...................... 10 2006 004 967

(51) Int. Cl.
*H02P 7/00* (2006.01)

(52) U.S. Cl. ........................ 318/432; 318/632; 318/638

(58) Field of Classification Search ................. 318/632, 318/638, 432, 434, 611
See application file for complete search history.

(56) References Cited

U.S. PATENT DOCUMENTS 3,760,252 A * 9/1973 Beery ......................... 318/611
4,684,277 A * 8/1987 Edstrom et al. .......... 400/639.1
5,596,931 A 1/1997 Rössler et al.
5,988,063 A 11/1999 Brandenburg et al.
6,796,183 B2 9/2004 Nöll
2002/0158180 A1* 10/2002 Noell ......................... 248/550
2003/0230205 A1 12/2003 Mutschler et al.
2005/0224219 A1 10/2005 Reier et al.
2006/0254442 A1 11/2006 Mutschler et al.

FOREIGN PATENT DOCUMENTS

DE 44 12 945 A1 10/1995
DE 197 40 153 A1 3/1999
DE 199 61 880 A1 3/2001
DE 101 49 525 A1 5/2002
DE 102 17 707 A1 11/2003
DE 103 55 122 A1 6/2005
EP 1 674 258 A1 6/2006

* cited by examiner

*Primary Examiner*—Rina I Duda
(74) *Attorney, Agent, or Firm*—Laurence A. Greenberg; Werner H. Stemer; Ralph E. Locher

(57) ABSTRACT

For the active compensation of oscillations in a machine which processes printing material, a signal which contains an oscillation of the machine or of a part of the machine is measured and at least one counter torque is introduced into the machine to reduce the oscillation. At least one measure for a ratio between the amplitude of the uncompensated oscillation and the amplitude of the counter torque necessary for complete compensation is compared with a threshold value. The counter torque is determined in a first functional relationship with the oscillation if the measure is greater than the threshold value, and the counter torque is determined in a second functional relationship with the oscillation, if the measure is smaller than the threshold value. In the machine, a regulating device is operated in a first or second operating mode in dependence on the measure of the ratio.

14 Claims, 2 Drawing Sheets

METHOD FOR ACTIVE COMPENSATION OF OSCILLATIONS IN A MACHINE WHICH PROCESSES PRINTING MATERIAL, AND A MACHINE WHICH PROCESSES PRINTING MATERIAL

CROSS-REFERENCE TO RELATED APPLICATION

This application claims the priority, under 35 U.S.C. §119, of German application DE 10 2006 004 967.5, filed Feb. 1, 2006; the prior application is herewith incorporated by reference in its entirety.

BACKGROUND OF THE INVENTION

Field of the Invention

The invention relates to a method for the active compensation of oscillations in a machine which processes printing material, in particular in a printing press, in which method at least one signal which contains an oscillation of the machine or of a part of the machine is measured and at least one counter torque is introduced into the machine in order to reduce the oscillation. Furthermore, the invention relates to a machine which processes printing material, having a regulating device for the active compensation of oscillations in the machine which processes printing material.

In machines which process printing material (also called machines which work on printing material), in particular printing presses, oscillations which occur are undesirable, in particular of a non-integral order in relation to the operating frequency of the machine, and have to be abated, as they have effects on the quality of the manufactured products. Undesirable oscillations are frequently compensated in an active manner, by a suitable counter torque being introduced into the machine which processes printing material, in order to counteract the measured oscillation.

Active oscillation compensation systems for machines which process printing material are known from published, non-prosecuted German patent application DE 101 49 525 A1 (corresponding to U.S. patent disclosure No. 2002/0158180 A1), U.S. Pat. No. 6,796,183 B2 and from U.S. Pat. No. 5,596,931, in which amplitudes and phases of discrete oscillations of different frequency are measured and processed in a regulating circuit, in order to determine the adequate counter torques for the compensation. It is apparent from published, non-prosecuted German patent application DE 102 17 707 A1, corresponding to U.S. patent disclosure No. 2003/0230205 A1, that an active oscillation compensation can be fed onto the drive regulating device for a machine which processes printing material, the compensation oscillation being calculated using a filter with its frequency parameters.

In order to compensate periodic disruptions, furthermore, it is known, for example, from published, non-prosecuted German patent application DE 197 40 153 A1 (corresponding to U.S. Pat. No. 5,988,063) and from published, non-prosecuted German patent application DE 103 55 122 A1 to provide an observer or periodic compensation regulator in a drive regulating circuit, in order to obtain input values for an actuator or a setpoint moment.

In machines which process printing material, in particular printing presses, it has been shown in practice that, in the event of certain parameters, for example the excitation frequency for a counter torque which is to be introduced, or combinations of parameters with certain compensation targets, for example the reduction of a cylinder oscillation or an oscillation of a cylinder combination, the use of the active oscillation compensation at a defined oscillation frequency leads to an unexpected increase or reinforcement of oscillations at some measuring points in the machine which processes printing material.

Although, in particular in the case of an unfavorable position of the location, at which the counter torque is introduced into the machine which processes printing material, in particular into the printing press, in relation to the oscillation shape of a disruption at a defined frequency, and in relation to the drive positions (motor positions) and/or measuring positions (sensor positions), the oscillation which is to be compensated can be regulated toward zero for a monitored compensation target, the oscillation amplitude can rise at other measuring locations in the machine as a result of the active oscillation compensation. In an unfavorable case, this results in that the active oscillation compensation can worsen the processing quality, in particular the printing quality. The problem also cannot be avoided completely by a skillful selection of possible locations for introducing a counter torque, drive positions and measuring positions. A free selection of the positions and/or the number of drive positions and measuring positions is frequently not possible anyway, as many boundary conditions are to be observed, for example an upper limit for the possible gear train loading.

SUMMARY OF THE INVENTION

It is accordingly an object of the invention to provide a method for active compensation of oscillations in a machine which processes printing material, and a machine which processes printing material that overcome the above-mentioned disadvantages of the prior art method and devices of this general type, which reduces or even avoids undesirable oscillation reinforcements in an active oscillation compensation device of a machine which processes printing material.

In the method according to the invention for the active compensation of oscillations (also called active oscillation damping, oscillation lessening or oscillation reduction) in a machine which processes printing material, in particular in a printing press, at least one signal which contains an oscillation of the machine or of a part of the machine, in particular at a first frequency, is measured (also detected or recorded). At least one counter torque (also called compensation moment) for reducing the oscillation, in particular at the first frequency, is introduced into the machine. At least one measure being a ratio between the amplitude of the uncompensated oscillation and the amplitude of the counter torque which is necessary for complete compensation (also called transfer behavior of the process or sensitivity of the machine or response of the machine) is compared with a threshold value. The counter torque, in particular the value and/or the phase of the counter torque which is to be introduced, is determined in a first functional relationship with the oscillation, in particular its amplitude and phase, if the measure is greater than the threshold value, and the counter torque which is to be introduced is determined in a second functional relationship with the oscillation, which second functional relationship is different than the first functional relationship, if the measure is smaller than the threshold value. In other words, the compensation with an active counter torque takes place with a first operating type above the threshold value and with a second operating type below the threshold value. The active counter torque is calculated, fixed or determined in one way, according to a first rule, above the threshold and in a second way (according to a second rule) below the threshold.

In particular, complete oscillation compensation, that is to say compensation until below a desired minimum limit, can advantageously be achieved as a compensation target with the method according to the invention. Unfavorable parameters or combinations of parameters can be countered in an inventive manner by a change in the parameters of the active oscillation compensation, so that a less strong, only a sufficiently small or even no undesirable excitation results. Unfavorable constellations can advantageously be avoided, in which oscillations of the machine are reinforced by active compensation. Only as small an intervention as possible into the machine dynamics takes place. It is clear to the expert who is addressed here that the counter torque which is to be introduced and is active has a temporal profile, a signal profile. In particular, it can have a frequency spectrum about a first frequency or main frequency. The value or amount of the counter torque which is to be introduced can be, in particular, the maximum or absolute value of the amplitude. The phase position of the counter torque can counteract, in particular, the phase position of the oscillation which is to be compensated.

It can advantageously be achieved with the method according to the invention that, if, in the event of a change of an operating parameter of the machine which processes the printing material, for example the machine speed, in particular of the printing press, for example its printing speed, excitation frequencies which are dependent on the operating parameter lie in a frequency interval, in which the measure for the ratio between the amplitude of the uncompensated oscillation and the amplitude of the counter torque which is necessary for complete compensation lies above the threshold value, the value of the counter torque which is to be introduced is determined in the first functional relationship with the strength of the oscillation, while the value of the counter torque is otherwise determined in the second functional relationship. In the case of a monotonous change in the operating parameter of the machine which processes printing material, for example a monotonous increase in the printing speed of the printing press, a successive change or switchover can result between the introduction of the counter torque according to the first functional relationship and the introduction according to the second functional relationship.

The compensation target can be the regulation of an oscillation of the overall machine or an oscillation of a part of the machine, in particular of an individual component of the machine, substantially to zero, preferably exactly to zero, in particular within tolerance limits. The oscillation which is to be compensated can be, in particular, a rotational oscillation. The measure for the ratio between the amplitude of the uncompensated oscillation and the amplitude of the counter torque which is necessary for complete compensation can be the strength of the oscillation, the absolute amount of the amplitude of the oscillation or the amplitude of the transfer function between the counter torque which is introduced by an actuator and the oscillation which is to be compensated. The counter torque can have the first frequency or a second frequency which is different than the first frequency. The counter torque can be fed onto a drive moment of the machine, in particular of the main drive of the machine. The counter torque can have a fixed frequency. If the measure is equal to the threshold value, it can be stipulated in the method according to the invention, depending on the embodiment, that the counter torque which is to be introduced is determined either in the first functional relationship with the oscillation or in the second functional relationship.

In one preferred embodiment of the method according to the invention for the active compensation of oscillations, the counter torque which is to be introduced in the second functional relationship is substantially zero or close to zero, preferably exactly zero. In other words, the active oscillation compensation is switched off in this embodiment below the lower threshold value, that is to say according to a fixed criterion, while it is switched on above the threshold value. The active oscillation compensation operates only when it is actually needed.

Furthermore, it is advantageous if, in the method according to the invention, the amplitude of the transfer function (also called frequency response) between the counter torque and the oscillation serves as the measure, and a comparison is carried out as to whether the transfer function exceeds the threshold value at least one frequency, that is to say the transfer function exceeds a fixed or selected amount. In particular, the exceeding of the amount by the transfer function can form one criterion for switching the active oscillation compensation on and off. In other words, the active compensation can be switched on only when the amplitude of the transfer function at the current oscillation frequency (of the oscillation which is to be compensated) exceeds a fixed threshold. The advantageous criterion can be the transfer function between the motor moment and the compensation target. In this way, it can be advantageously avoided or reduced that an undesirable increase or reinforcement of oscillations takes place at some of the measuring locations in the machine which processes printing material if the value of the transfer function between the counter torque, in particular the drive moment, and the compensation target is small.

In concrete embodiments of the method according to the invention, the active oscillation compensation can be switched on only when the monitored oscillation order of the machine which processes printing material, in particular a printing press, lies near a resonant frequency at the current operating speed, in particular the printing speed. For the machine which processes printing material, the resonant frequencies and the threshold values for the comparison according to the invention are determined with the measure for the ratio between the amplitude of the uncompensated oscillation and the amplitude of the counter torque which is necessary for complete compensation, as a function of the operating speed.

Furthermore or as an alternative, there can be provision in the method according to the invention for the active compensation of oscillations for the transfer function between the counter torque and the oscillation to be measured for initialization. In this way, the necessary threshold value can be determined in an automated manner in the machine which processes printing material, with low expenditure on programming or maintenance, with the result that the ranges for the first operating type and the second operating type are fixed.

In concrete embodiments of the method according to the invention, the location of the measurement of the oscillation of the machine or of a part of the machine at the first frequency and the location of the introduction of the counter torque for the reduction of the oscillation may not coincide. In other words, the measuring devices, such as sensors, rotary encoders, encoders or the like, can be positioned at measuring locations, while the counter torque is transmitted to the machine at another location via an actuator, for example a drive or motor.

It is particularly preferable if, in one embodiment of the method according to the invention, the machine which processes printing material is driven in a manner which is controlled or regulated to an operating frequency. In other words, the method for the compensation of oscillations eliminates undesirable disruptions in the control or regulating device of the machine which processes printing material, in particular in the control or regulating device of the main drive of the machine which processes printing material.

The method according to the invention can be configured in such a way that the amplitude and the phase of the oscillation are determined from the measurements. In particular, one embodiment of the method according to the invention can also have features or combinations of features of the active oscillation compensation, which features have been disclosed in published, non-prosecuted German patent application DE 101 49 525 A1 and in U.S. Pat. No. 6,796,183 B2. The disclosed contents of DE 101 49 525 A1 and U.S. Pat. No. 6,796,183 B2 are hereby incorporated by reference in its entirety herein.

Furthermore or as an alternative, the method according to the invention can be configured in such a way that the at least one counter torque is determined by use of a filter which loads a transfer function with a frequency parameter which corresponds to the frequency of the oscillation which is to be compensated. In particular, one embodiment of the method according to the invention can also have features or combinations of features of the active oscillation compensation, which features have been disclosed in published, non-prosecuted German patent application DE 102 17 707 A1, corresponding to U.S. patent disclosure No. 2003/0230205 A1. The disclosed contents of DE 102 17 707 A1 and U.S. 2003/0230205 A1 are herewith incorporated by reference in its entirety herein.

In the method according to the invention, the oscillation which is to be compensated can be an oscillation of the machine shaft or a signal value difference of two or of more than two machine shafts, or a natural mode of the machine which processes printing material or a natural mode of a part of the machine which processes printing material.

Furthermore or as an alternative, the frequency of the oscillation can be a non-integral multiple of an operating frequency of the machine which processes printing material.

In concrete embodiments of the method according to the invention, it is particularly preferred if the method is applied for a multiplicity of oscillations of different frequencies, in particular at the same time. In particular, a plurality of oscillation intrinsic waveforms of the machine which processes printing material can be compensated.

A machine which processes printing material, in particular a printing press, having a regulating device for the active compensation of oscillations in the machine which processes printing material is also associated with the method according to the invention. According to the invention, the regulating device of the machine which processes printing material is adapted for carrying out the method having features or combinations of features according to this embodiment and, if the measure for the ratio between the amplitude of the uncompensated oscillation and the amplitude of the counter torque which is necessary for complete compensation for the sensitivity of the machine is greater than the threshold value, can be operated in a first operating mode and, if the measure for the ratio between the amplitude of the uncompensated oscillation and the amplitude of the counter torque which is necessary for complete compensation for the sensitivity of the machine is smaller than the threshold value, can be operated in a second operating mode.

The machine according to the invention which processes printing material can be, in particular, a printing press (for example, an offset printing press or a multiple-color printing press or a packaging printing press or a label printing press), a printing form exposer (for example, an external drum exposer for offset printing plates) or a machine for print further processing (for example, a punching machine or a folding machine or a gathering and stitching machine).

The method according to the invention is used particularly preferably in printing presses having a high number of printing units, that is to say having eight or more printing units, in particular offset printing units.

Other features which are considered as characteristic for the invention are set forth in the appended claims.

Although the invention is illustrated and described herein as embodied in a method for active compensation of oscillations in a machine which processes printing material, and a machine which processes printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
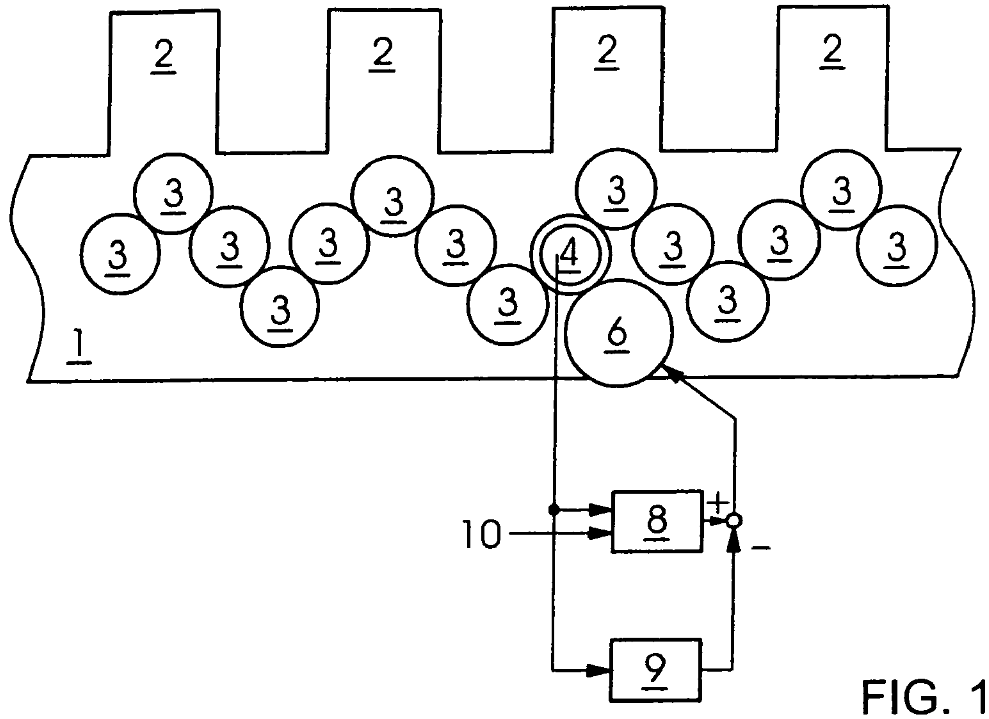
FIG. 1. is a diagrammatic illustration of one embodiment of a machine according to the invention which processes printing material, having a regulating device, adapted for carrying out a method according to the invention.

Before features and details of advantageous embodiments of machines according to the invention which process printing material are described in detail with reference to the illustration in FIGS. 1 and 2, first, the sequence of the provision and carrying out of one preferred exemplary embodiment of the method according to the invention is to be described at this point.

Sensors for measuring the oscillation amplitude and a motor for applying the compensation moment or counter torque are required for the active compensation of an oscillation. The main drive, which is present in any case, of the machine which processes printing materials can be used for applying the compensation moments. It has proven appropriate to use two rotary encoders as sensors, one of the rotary encoders tending to be located at the machine start and the other tending to be located at the machine end. Here, the machine tacho which is present in any case can be used as an encoder or sensor, with the result that only one additional encoder is required.

Motor positions which are particularly advantageous for active oscillation compensation can be found with simulation calculations. However, there are various restrictions, as further criteria are to be observed for the position of the main drive and of the machine tacho, with the result that the most favorable configuration for the active oscillation compensation cannot usually be realized. For example, the motor for applying the compensation moments must not lie in an oscillation node. The oscillation node is frequently situated approximately in the center of the machine. At the same time, the drive position is selected in printing presses in such a way that the gear train loading and the static print offset are as low as possible. For a concrete machine configuration or a concrete machine model, the motor positions are therefore fixed as a compromise between the requirements for the active oscillation compensation and the other restrictions.

The compensation target is the amount of oscillation which the active oscillation compensation changes to zero by introduction of counter torques. One possible compensation target for a printing press is, for example, the deviation of the rotational speed of the first printing cylinder from a setpoint speed. If the oscillation compensation is switched on, the oscillation measure for the abated order would be almost zero. The theory on which this is based says that only one compensation target can be achieved with a single motor. It has been shown that a particularly advantageous compensation target is the differential distance between the two abovementioned measuring locations or the difference of the amplitudes at the two abovementioned measuring locations. That is to say, the active oscillation compensation introduces counter torques in such a way that the differential distance between the two measuring locations or the difference of the amplitudes at the two measuring locations tends toward zero.

For the preferred configuration of the active oscillation compensation according to the invention in a single machine, the transfer function (also called frequency response) between the motor moment and the compensation target is measured in a single-time initialization run. The transfer function is therefore available in the machine software after this measurement.

During operation of the machine, in particular printing operation, the active oscillation compensation monitors defined frequency portions or order portions of the oscillation signal which is defined as the compensation target. An algorithm calculates the counter torques in such a way that the compensation target tends toward zero. Algorithms of this type which are particularly advantageous are available to the expert, for example, in published, non-prosecuted German patent application DE 101 49 525 A1, U.S. Pat. No. 6,796,183 B2, published, non-prosecuted German patent application DE 102 17 707 A1 or in U.S. patent disclosure No. 2003/0230205 A1. Although the monitored compensation target is regulated to zero in unfavorable constellations of the action location and frequency of the disruption, and motor positions and sensor positions, the oscillation amplitudes rise at other measuring locations in the machine as a result of the active oscillation compensation. According to the invention, there is therefore provision in these embodiments for the active oscillation compensation to be switched on and off in a targeted manner.

The switching on and off can take place according to different criteria. It has been shown that a particularly advantageous criterion can be formulated via the measured transfer function between the motor moment and the compensation target. Accordingly, the active compensation is only switched on when the amplitude of the transfer function at the current oscillation frequency exceeds a fixed threshold, for example 10%, 30% or 50% of its maximum value.

FIG. 1 diagrammatically shows a detail of one embodiment of a machine 1 which processes printing materials, in particular a printing press having a plurality of printing units 2 and cylinders 3, having a regulating device and an active oscillation compensation according to the invention for one cylinder. The machine 1 which processes printing material of this embodiment can have either a continuous gear train or an interrupted gear train. The use, according to the invention, of a regulating device having a regulating element 8 and a compensation device 9 is not restricted to the reduction of oscillations at transfer points between sheet-guiding cylinders, but can also be used in general for improved regulation or compensation of oscillations of cylinders, for example the printing form cylinder, transfer cylinder or blanket cylinder or impressions cylinder, and rolls and rollers in inking and/or dampening units. FIG. 1 shows one example of a regulating device having parallel compensation for a first cylinder 4: a representative signal for the profile of the angle variable (temporal profile of the value of the angle variable) is generated by an angular position encoder and is fed to the regulating element 8 together with an angle variable setpoint value 10. The regulating element 8 can be a simple differential regulator or else a regulator which contains complicated transformations (integrations, differentiations and the like). The signal which is representative for the profile of the angle variable is also fed in parallel to the compensation device 9. The output signal of the latter is superimposed on the output signal of the regulating element 8 at the subtraction point after the regulating element 8. The superimposed signal is fed to a first actuator 6. As the frequency which is to be compensated or the frequencies which are to be compensated of the compensation device 9 can be set, oscillations of an integral order can also be compensated in addition to oscillations of a non-integral order in comparison with the machine frequency. According to the invention, the compensation device 9 of the regulating device is then configured in such a way that it is switched on or off as a function of the result of the comparison of the measure for the sensitivity of the machine with the threshold value.

Figure 2:
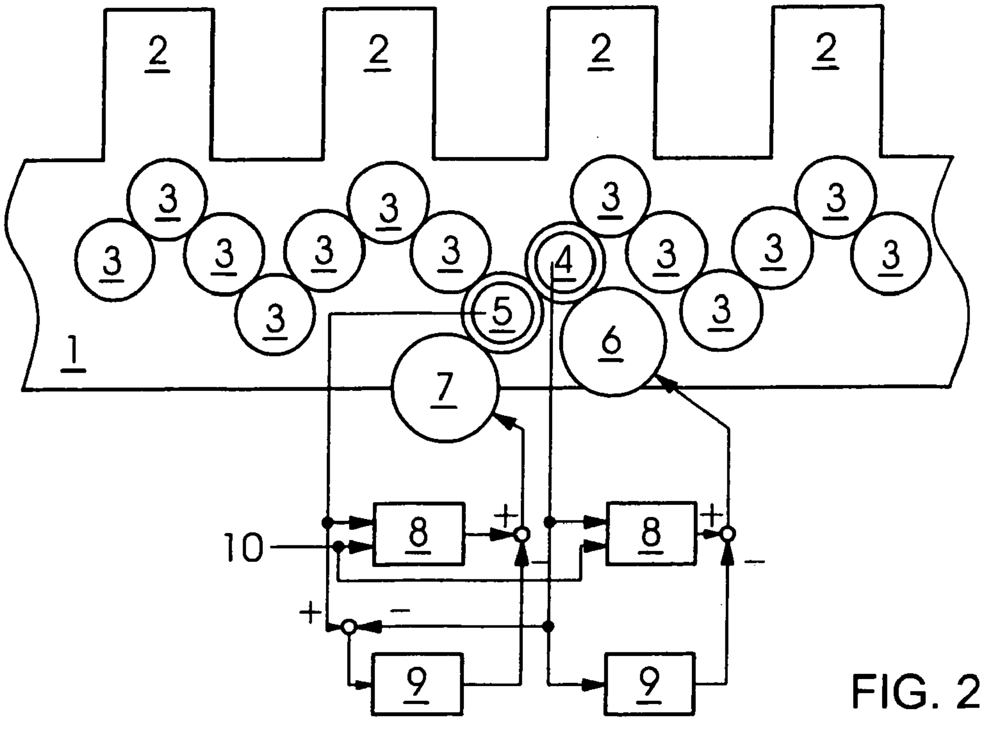
FIG. 2 is a diagrammatic, illustration of an alternative embodiment of a machine according to the invention which processes printing material, having the regulating device, adapted for carrying out the method according to the invention.

FIG. 2 is a diagrammatic detail of an alternative embodiment of the machine 1 which processes printing material, in particular a printing press which contains a plurality of printing units 2 and cylinders 3, having a separate gear train, two regulating devices and two oscillation compensation means according to the invention. In this embodiment, for the compensation of oscillations at a transfer location between two sheet-guiding cylinders, first a separate compensation takes place for the first cylinder 4 and for the second cylinder 5, but secondly a relative compensation is also carried out for the angular difference, shown here by way of example for the second cylinder 5. This embodiment advantageously combines an absolute reduction of the oscillations with the relative reduction of the oscillations (relevant angle variable for the sheet transfer). The first cylinder 4 is assigned the regulating element 8 which is fed a representative signal for the angle variable of the first cylinder 4 (value of the angle variable) and an angle variable setpoint value 10. The compensation device 9 is provided in parallel with the regulating element 8, the output signal of the compensation device 9 being superimposed on the output signal of the regulating element 8 at the subtraction point after the regulating element 8. The superimposed signal is fed to the first actuator 6. The second cylinder 5 is also assigned a regulating element 8 which is fed a representative signal for the angle variable of the second cylinder 5 (value of the angle variable) and an angle variable setpoint value 10. The differential angle between the cylinder 4 and the cylinder 5 or a variable which is linearly dependent thereon, a measure for the differential angle, is fed to the compensation device 9 at a subtraction point. The output signal of the compensation device 9 is superimposed on the output signal of the regulating element 8 at a subtraction point after the regulating element 8 of the second cylinder 5. The superimposed signal is fed to a second actuator 7.

According to the invention, the compensation devices 9 of the regulating device are then configured in such a way that they are switched on or off as a function of the result of the comparison of the measure for the sensitivity of the machine with the threshold value.

Figure 3A:
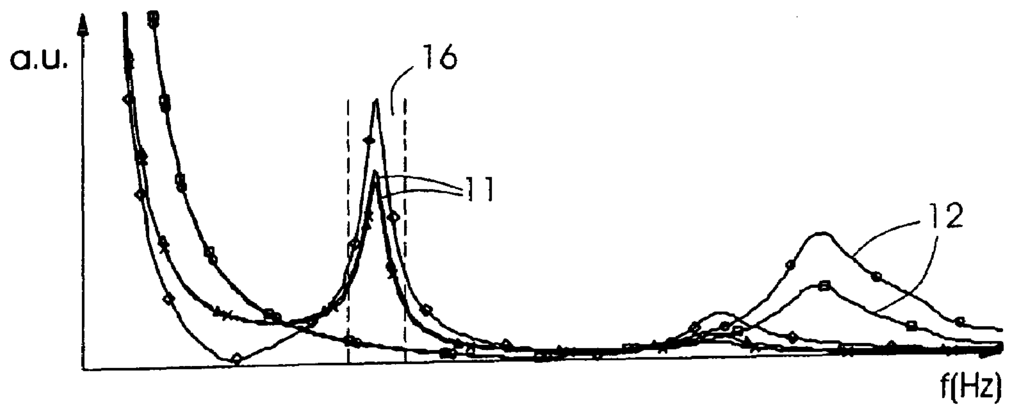
FIGS. 3A-3C are graphs showing the significance of a threshold value according to the invention for switching an active oscillation compensation on and off in one preferred embodiment of the method according to the invention.
Figure 3B:
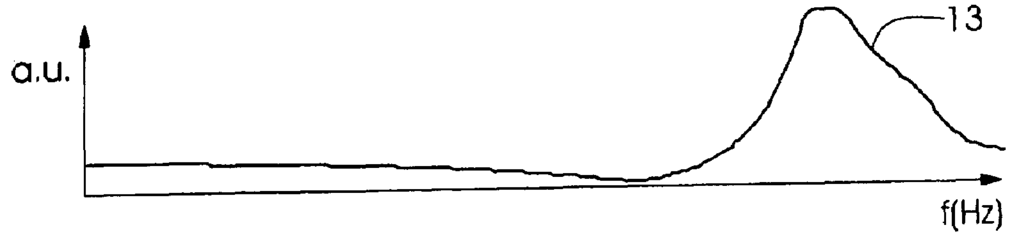
Figure 3C:
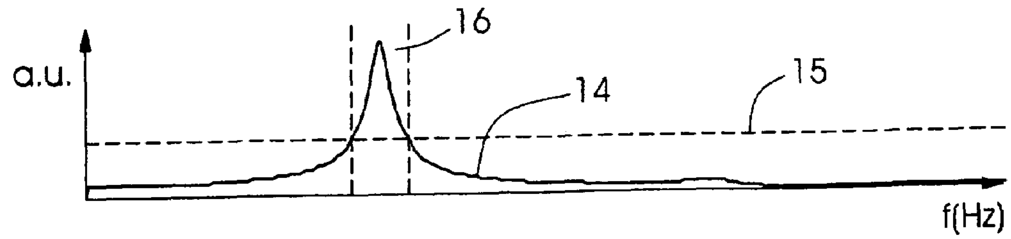

FIGS. 3A-3C diagrammatically show a significance of a threshold value according to the invention for switching the active oscillation compensation on and off in one preferred embodiment of the method according to the invention.

In FIG. 3A, oscillation amplitudes are plotted as a function of the frequency in applicable units (a.u.). First, oscillation amplitudes 11 are shown which are measured without compensation, that is to say with the active oscillation compensation switched off at a defined frequency, in particular at a defined value of an operating parameter, such as the printing speed, for example. These have a maximum at a defined first frequency. Second, oscillation amplitudes 12 are shown which are measured with compensation, that is to say with the active oscillation compensation switched on. It can be seen clearly that these oscillation amplitudes then have a maximum at a defined second frequency which is higher than the first frequency. At the same time, the oscillation amplitudes 12 at the second frequency are significantly reduced in comparison with the oscillation amplitudes 11. Therefore, while the compensation target can be met on the one hand, the machine which processes printing material oscillates at a different frequency on the other hand, however with a lower amplitude, in particular if the machine which processes printing material is operated at a different value of the printing speed.

In FIG. 3B, the amount of the amplitude of the required counter torque 13 or compensation torque is plotted as a function of the frequency in applicable units (a.u.). It can be seen that the required counter torque 13 is particularly large in the range of the second frequency, with the result that an excitation can take place of the machine which processes printing material.

In FIG. 3C, a transfer function 14 or a frequency response from the compensation torque to the compensation variable, the compensation target, is shown in applicable units (a.u.). A threshold value 15 is fixed.

If the amplitude of the transfer function 14 then exceeds a threshold value 15, in particular at least one frequency, the active oscillation compensation is switched on in this embodiment. The exceeding takes place at a frequency interval in a compensation window 16, which, as can be seen in FIG. 3A, encloses the maxima which occur at the first frequency.

We claim:

1. A method for actively compensating for oscillations in a machine processing printing materials, which comprises the steps of:

measuring at least one signal containing an uncompensated oscillation of the machine or of a part of the machine;

comparing at least one measure of a ratio between an amplitude of the uncompensated oscillation and an amplitude of a counter torque necessary for complete compensation with a threshold value;

determining the counter torque to be introduced on a basis of a first functional relationship with the uncompensated oscillation if the measure is greater than the threshold value;

determining the counter torque to be introduced on a basis of a second functional relationship with the uncompensated oscillation if the measure is smaller than the threshold value, the second functional relationship being different than the first functional relationship; and introducing the counter torque into the machine for reducing the uncompensated oscillation.

2. The method for actively compensating for oscillations according to claim 1, which further comprises setting a value of the counter torque to be introduced in the second functional relationship to be substantially zero.

3. The method for actively compensating for oscillations according to claim 1, which further comprises feeding the counter torque onto a drive moment of the machine.

4. The method for actively compensating for oscillations according to claim 1, which further comprises:

using an amplitude of a transfer function between the counter torque and the uncompensated oscillation as the measure; and carrying out a comparison as to whether the transfer function exceeds the threshold value at least one frequency.

5. The method for actively compensating for oscillations according to claim 4, which further comprises, for initialization, measuring the transfer function between the counter torque and the uncompensated oscillation.

6. The method for actively compensating for oscillations according to claim 1, wherein a location of a measurement of the uncompensated oscillation of the machine or of a part of the machine at a first frequency and a location for an introduction of the counter torque for reducing the uncompensated oscillation do not coincide.

7. The method for actively compensating for oscillations according to claim 1, which further comprises driving the machine for processing the printing materials in a manner which is controlled or regulated to an operating frequency.

8. The method for actively compensating for oscillations according to claim 1, which further comprises determining an amplitude and a phase of the uncompensated oscillation from results of the measuring step.

9. The method for actively compensating for oscillations according to claim 1, which further comprises determining the counter torque using a filter which loads a transfer function with a frequency parameter corresponding to a frequency of the uncompensated oscillation which is to be compensated.

10. The method for actively compensating for oscillations according to claim 1, wherein the uncompensated oscillation is an oscillation of the machine shaft or a signal value difference of two or of more than two machine shafts, or a natural mode of the machine or a natural mode of the part of the machine.

11. The method for actively compensating for oscillations according to claim 1, wherein a frequency of the uncompensated oscillation is a non-integral multiple of an operating frequency of the machine.

12. The method for actively compensating for oscillations according to claim 1, which further comprises performing the method for a multiplicity of oscillations of different frequencies.

13. A machine for processing printing materials, the machine comprising:

a regulating device for actively compensating for oscillations in the machine, said regulating device being programmed to:

measure at least one signal containing an uncompensated oscillation of the machine or of a part of the machine;

compare at least one measure of a ratio between an amplitude of the uncompensated oscillation and an amplitude of a counter torque necessary for complete compensation with a threshold value;

determine the counter torque to be introduced on a basis of a first functional relationship with the uncompensated oscillation if the measure is greater than the threshold value;

determine the counter torque to be introduced on a basis of a second functional relationship with the uncompensated oscillation if the measure is smaller than the threshold value, the second functional relationship being different than the first functional relationship; and introduce the counter torque into the machine for reducing the uncompensated oscillation; and if the measure for the ratio between the amplitude of the uncompensated oscillation and the amplitude of the counter torque is greater than the threshold value, operating said regulating device in a first operating mode and, if the measure for the ratio between the amplitude of the uncompensated oscillation and the amplitude of the counter torque which is necessary for complete compensation is smaller than the threshold value, operating said regulating device in a second operating mode.

14. The machine according to claim 13, wherein the machine is selected from the group consisting of printing presses, printing form exposers and machines for further processing of printed materials.

* * * * *